UNITED STATES PATENT OFFICE.

FERDINAND EVERS, OF DUSSELDORF, GERMANY, ASSIGNOR TO CHEMISCHE FABRIK REISHOLZ GESELLSCHAFT M. B. H., OF REISHOLZ, NEAR DUSSELDORF, GERMANY.

PROCESS OF MANUFACTURE OF ARTIFICIAL AROMATIC BALSAMS.

No. 880,641.  Specification of Letters Patent.  Patented March 3, 1908.

Application filed May 25, 1907. Serial No. 375,617.

*To all whom it may concern:*

Be it known that I, FERDINAND EVERS, chemist, a subject of the German Emperor, at present residing at No. 42 Stefanienstrasse, Dusseldorf, in the Kingdom of Prussia, Germany, have invented a new and useful Process of Manufacture of Artificial Aromatic Balsams, of which the following is a full and complete specification.

Aromatic gum-resins and balsams contain, as essential components resin ethers, combinations of resin alcohols, as resinotannols, with cinnamic acid, benzoic acid and sebacic acids. Gum resins flow either on an incision being made in the trunk of the balsam tree or on these trees being scorched after receiving the necessary wounds. Sometimes the gum resins are present as such in the trees and are obtained by a boiling process. The gum-resins which are obtained by simply wounding the trees as, for example, benzoin, are considerably weaker in aroma than those that are won by burning or scorching the trees as, for example, Peru balsam. The resin ethers already contained in the wood of the trees or created by the incision are disintegrated by the scorching process, and the resultant product is liquid and tar-like and more or less aromatic, which are essential characteristics of the balsam. By heating to a high temperature—over 200°—the resin ether of the solid or semi-liquid gum resins such as gum benzoin, tolu-balsam, storax, may be transformed into aromatic products, which volatilize more or less at this temperature and which may be recovered by condensation, so that they can be added to the residue in any desired proportions. By the addition thereto of suitable aromatic products which are further components of the liquid, natural balsam, such as the benzoic-acid-ether and cinnamic-acid-ether of benzylalcohol and cinnamylalcohol (cinnamene) and which can be artificially manufactured by known synthetic methods, balsams can be recovered which are not only the equal of the natural ones in regard to the delicacy of aroma and medicinal value, but are superior to them and, at the same time, are considerably cheaper.

The process is as follows:—The gum resin, such as gum benzoin, tolubalsam, storax, is heated carefully up to 200° centigrade, under gradually increasing temperature. The heating process may be continued as long as no empyreuma is caused, which may be readily detected by the smell. A darkening of the product indicates when the temperature is sufficiently high. During the above heating process, the volatile products are collected by condensation and are afterward heated together with the residue. If it is desired to produce a liquid balsam, such as an artificial balsam resembling Peru-balsam, such aromatic ingredients as are contained in the natural Peru-balsam, as for instance cinnamene, are added to the product till the desired consistency is attained.

The following gives the approximate quantities of ingredients, etc., used in carrying my process into effect: 50 kilograms tolu-balsam and 50 kilograms storax are carefully heated in a still up to 200° centigrade, whereupon the temperature is gradually increased to 240° C. If at this temperature, no empyreumatic products are formed, which may be readily detected by the burned odor, the temperature may be further increased, but not beyond 270° C., because otherwise empyreuma would set in. At the latter temperature, about 5 kilograms distillate will be produced, such result demonstrating that not all volatile substances pass over. The distillate is then mixed with the slightly cooled but still hot residuum while stirring the mixture, whereupon 75 kilograms natural or artificial cinnamene are added if it is desired to produce a liquid balsam.

Having now fully described my invention, what I claim as new and desire to secure by Letter Patent is:—

The process of making an artificial aromatic balsam which consists in heating a mixture of tolu-balsam and storax in a closed vessel to a temperature above 200° C., but below the temperature at which empyreumatic products are formed, condensing the products volatilized by said heating and mixing them with the unvolatilized residues, and finally adding cinnamene, to the product thus formed, substantially as specified.

Signed by me at Dusseldorf, Germany, this thirteenth day of May, 1907.

FERDINAND EVERS.

Witnesses:
 ALFRED POHLMEYER,
 M. ENGELS.